United States Patent Office 3,307,260
Patented Mar. 7, 1967

3,307,260
DENTAL PROSTHESIS FROM NORMALLY CRYSTALLINE THERMOPLASTIC POLYMERS
Robert H. Allen, Midland, Mich., assignor to The Dow Chemical Company, Midland, Mich., a corporation of Delaware
No Drawing. Filed June 5, 1964, Ser. No. 373,088
3 Claims. (Cl. 32—2)

The present invention is concerned broadly with the preparation of prosthesis for dental purposes from normally crystalline thermoplastic polymers, such as the normally crystalline vinylidene chloride polymers, and, more particularly, to dentures having a base plate formed from such unique resinous material.

By the term "normally crystalline polymer" as used herein is meant those solid thermoplastic polymerization products, whether polymers, copolymers, interpolymers or otherwise named which exhibit characteristic X-ray diffraction patterns.

"Supercooled normally crystalline polymer" as used herein means normally crystalline thermoplastic polymer which has been substantially completely fused by heating it to a temperature above its crystalline melting point and then cooled or chilled in such a manner as to bring it to a temperature below the crystalline melting point without substantial recrystallization, which polymer when reheated to normal room temperature first becomes soft and pliable and subsequently crystallizes to form a strong, rigid, moisture-proof, non-toxic material.

As used herein, the term "normally crystalline vinylidene chloride polymer" includes the polymer of vinylidene chloride alone, its copolymers, and interpolymers which exhibit crystallinity when examined by X-ray diffraction methods or between crossed Nicol prisms and compositions prepared therefrom by the inclusion of modifying agents, which compositions retain the working characteristics of the crystalline polymers.

Prosthesis for dental purposes, and particularly denture base materials, should meet the following general requirements: It should be easy to manipulate; it should have sufficient strength and resilience at normal temperatures and pressures; it should be capable of easy repair and should neither shrink nor expand during fabrication of the same; there should be sufficient impact strength; it should be impermeable to fluids and resist bacterial action and growth; it should harmonize with the tissues of the human body in color and translucency and should retain such properties indefinitely; and it should be both odorless and tasteless and capable of retaining its shape.

Dentures and other such prosthesis have been made from many substances, for example, those materials as described in the U.S. Patents 2,318,845, 2,475,802, 2,497,-451, 2,558,139, 2,576,994 and 2,807,602, among many other references. In this regard, the most common method of making dentures is to mix a methacrylate polymer in bead form with about half its weight of a methacrylate monomer in a mortar for about 15 minutes to form a plastic dough, which is then placed in a dental flask and cured. This is known as a powder-liquid technique. The "flask" is generally prepared from two metal frames which are pressed together by a screw clamp. The plaster inside of the metal frames is hollowed out to form a mold in the shape of a dental plate in which porcelain teeth and the mixture of polymer and monomer are placed. The denture is then covered with tin foil to protect it from water during the subsequent cure.

Such prior known methods and materials have been found to have a number of defects, the most noticeable and important of which include: excessive shrinkage of the polymer base plate during curing, resulting in an accompanying initial bad fit in the mouth; a lack of thermoplasticity at tolerable mouth temperature which precludes ready adjustment of such initial bad fit; and a tendency to absorb considerable amounts of water from the mouth.

Accordingly, it is an object of this invention to provide improved prosthesis for dental purposes.

It is another object of this invention to provide a denture, and a method of preparing the same, having the combination of desirable properties as described herein which may be easily and properly fitted in the mouth.

It has been found that certain crystalline thermoplastic resinous materials, such as the normally crystalline vinylidene chloride polymers as described in the U.S. Patents 2,233,442, 2,251,486, 2,291,670, 2,321,292 and 2,753,321, among many others, have unique utility for the formation of prosthesis for dental use in general and are particularly useful for the formation of base plates for dentures. In this regard, it is well known that if the hereinbefore defined normally crystalline resinous material is rapidly supercooled from a molten state to an essentially amorphous form, it may then be maintained for extended periods of time as a hard, non-crystalline material at temperatures below its second order transition. The second order transition temperature is defined as that temperature at which free rotation of the segments of the polymer chain begins. The second order transition temperature for polyvinylidene chloride has been found to be about $-17°$ C., whereas the second order transition temperature of the normally crystalline copolymers and interpolymers of vinylidene chloride, such as those polymeric materials containing from about 70–95 weight percent vinylidene chloride and, correspondingly, from about 30–5 weight percent of one or more monoethylenically unsaturated comonomers including vinyl chloride, acrylonitrile, vinyl acetate, vinyl propionate and alkyl and aralkyl acrylates and alkyl and aralkyl groups of up to about 8 carbon groups, may be somewhat higher, i.e., up to about $0°$ C. or slightly higher.

Where an extended period of storage is necessary (two weeks or more) the resinous material is effectively stored in a deep-freeze at a temperature below $-20°$ C. to $-100°$ C. Such deep-freeze storage insures against any significant crystallization of the material. For example, most normally crystalline vinylidene chloride polymers will crystallize to stiffness in 10–20 minutes at $30°$ C. and in several hours at about $0°$ C. However, some crystallization is also noted in normally crystalline vinylidene chloride polymers when such polymers are stored for periods of several weeks at temperatures between about $0°$ C. and $-20°$ C. Obviously, the lower the temperature the greater the storability.

It is further pointed out that when such super-cooled polymer is permitted to warm to room temperature it will first become soft and extremely pliable and will eventually crystallize into a rigid, non-deformable plastic.

As noted above, a fraction of an hour is generally sufficient to attain such rigidity when the polymer has warmed to a temperature between about $20°$ C. and $30°$ C.

Applying these unique characteristics to the preparation of dental prosthesis and more particularly to the preparation of dentures combined of a thermoplastic resinous base plate and porcelain teeth while utilizing a conventional dental "flask," it has been found that the base plate of such denture may effectively be formed from a supercooled, essentially non-crystalline polymeric resinous material, as defined herein, and then stored for extended periods of time below the second order transition temperature of the polymeric resin. Thereafter, the denture may be gradually warmed to normal room temperature or those temperatures tolerable to human flesh and easily and exactly fitted to the mouth while such base plate is in a soft, easily workable state. Since crystallization does not occur immediately, the denture can be applied at room temperature provided the physician does not permit too much time to elapse before it is properly fitted. Alternatively, it may be applied at a temperature between about 0° C. and 20° C., then, after a period of time at room temperature, the plastic will crystallize into a hard rigid object. Since no toxic solvents or unusual heat conditions are needed or evolved by reason of internal reaction, a safe method of application is provided. It is further pointed out that the dentures of the present invention are characterized by excellent strength and resilience at normal mouth temperatures and under all normal masticating stresses, and additionally are characterized by impermeability to mouth fluids and bacterial action. Further, such dentures are both odorless and tasteless and may be dyed or otherwise colored to harmonize in color and translucency with the soft tissues of the mouth. Such dentures are further capable of retaining their shape indefinitely whether in or out of the mouth under all normal conditions of temperature and pressures.

It is to be understood that the invention is not to be limited by the preferred embodiment thereof which is set forth in the foregoing description and specification, but is to be interpreted in the light of what is set forth in the hereto attached claims.

What is claimed is:

1. A method of preparing dentures having a thermoplastic base plate which may be readily fitted to the mouth, said method comprising the sequential steps of:

(1) Forming a preform of said base plate from a normally crystalline vinylidene chloride resin while said resin is in a supercooled, essentially non-crystalline state;
(2) Warming said supercooled resin to a temperature above its second order transition temperature, but at a temperature tolerable to human flesh;
(3) Finally shaping said base plate to the mouth while said resin is in a flexible, essentially amorphous condition, and
(4) Allowing said resin to crystallize to form a rigid, essentially non-deformable article.

2. The method of claim 1 wherein said resin is allowed to crystallize at ordinary room temperature.

3. A denture having a base plate formed essentially from a crystalline vinylidene chloride resin.

References Cited by the Examiner
UNITED STATES PATENTS 2,101,431   12/1937   Groff _____ 32—2
2,344,511   3/1944    Harder.

ALEXANDER H. BRODMERKEL, *Primary Examiner.*

ROBERT F. WHITE, *Examiner.*

B. SNYDER, *Assistant Examiner.*